United States Patent
Kim et al.

(10) Patent No.: US 11,428,968 B2
(45) Date of Patent: Aug. 30, 2022

(54) OPTICAL DEVICE AND USE THEREOF

(71) Applicant: LG Chem, Ltd., Seoul (KR)

(72) Inventors: Nam Hun Kim, Daejeon (KR); Jung Woon Kim, Daejeon (KR); In Ju Mun, Daejeon (KR); Su Young Ryu, Daejeon (KR); Byoung Kun Jeon, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 17/046,165

(22) PCT Filed: Apr. 24, 2019

(86) PCT No.: PCT/KR2019/004967
§ 371 (c)(1),
(2) Date: Oct. 8, 2020

(87) PCT Pub. No.: WO2019/209029
PCT Pub. Date: Oct. 31, 2019

(65) Prior Publication Data
US 2021/0157196 A1    May 27, 2021

(30) Foreign Application Priority Data
Apr. 26, 2018  (KR) .................. 10-2018-0048684

(51) Int. Cl.
*G02F 1/1333*  (2006.01)
*G02F 1/1337*  (2006.01)
(Continued)

(52) U.S. Cl.
CPC ........ *G02F 1/133305* (2013.01); *G02F 1/137* (2013.01); *G02F 1/1337* (2013.01); *G02F 1/1339* (2013.01); *G02F 1/134309* (2013.01)

(58) Field of Classification Search
CPC ................................ G02F 1/133305
See application file for complete search history.

(56) References Cited

U.S. PATENT DOCUMENTS 6,806,940 B1 * 10/2004 Noguchi ........... G02F 1/133371
349/153
7,791,784 B2     9/2010 Giron et al.
(Continued)

FOREIGN PATENT DOCUMENTS

JP      S5988719 A    5/1984
JP      H05043130 U   6/1993
(Continued)

OTHER PUBLICATIONS

Search report from International Application No. PCT/KR2019/004967, dated Jul. 31, 2020.
European Search Report for Application No. EP 19792177, dated May 7, 2021, 7 pages.

*Primary Examiner* — Edmond C Lau
(74) *Attorney, Agent, or Firm* — Lerner, David, Littenberg, Krumholz & Mentlik, LLP

(57) ABSTRACT

An optical device and a use thereof are provided. The optical device is capable of suppressing external bubble inflow by eliminating negative pressures that can occur due to shape deformation of a base material in an environment changing between a high temperature and a low temperature and generating a positive pressure. Such optical device can be used as various transmittance-variable devices.

13 Claims, 3 Drawing Sheets

(51) Int. Cl.
*G02F 1/1339* (2006.01)
*G02F 1/1343* (2006.01)
*G02F 1/137* (2006.01)

(56) References Cited

U.S. PATENT DOCUMENTS

| | | | |
|---|---|---|---|
| 8,730,368 | B2 | 5/2014 | Kwon et al. |
| 2006/0078693 | A1* | 4/2006 | Ishibashi .............. G02B 5/3083 428/1.31 |
| 2016/0170118 | A1* | 6/2016 | Chien ................. G02F 1/13718 349/193 |
| 2017/0059935 | A1 | 3/2017 | Hakoi et al. |
| 2017/0133530 | A1* | 5/2017 | Arai ........................ B32B 27/08 |
| 2018/0143480 | A1 | 5/2018 | Hirakata |
| 2019/0204677 | A1* | 7/2019 | Kim ...................... B32B 27/304 |
| 2020/0124923 | A1 | 4/2020 | Kim et al. |
| 2020/0285107 | A1 | 9/2020 | Park et al. |

FOREIGN PATENT DOCUMENTS

| | | |
|---|---|---|
| JP | 2001142055 A | 5/2001 |
| JP | 2002258255 A | 9/2002 |
| JP | 2017090555 A | 5/2017 |
| JP | 2017151289 A | 8/2017 |
| KR | 20170064744 A | 6/2017 |
| KR | 20180012714 A | 2/2018 |
| WO | 2017014305 A1 | 1/2017 |
| WO | 2018021837 A1 | 2/2018 |
| WO | 2017095176 A1 | 5/2018 |

\* cited by examiner

[Figure 1]
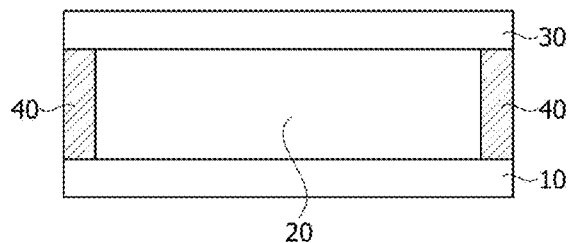
[Figure 2]
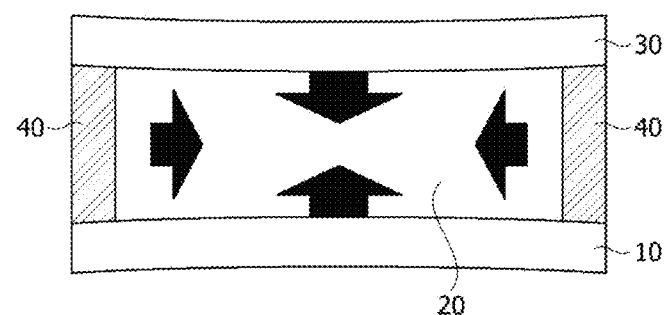
[Figure 3]
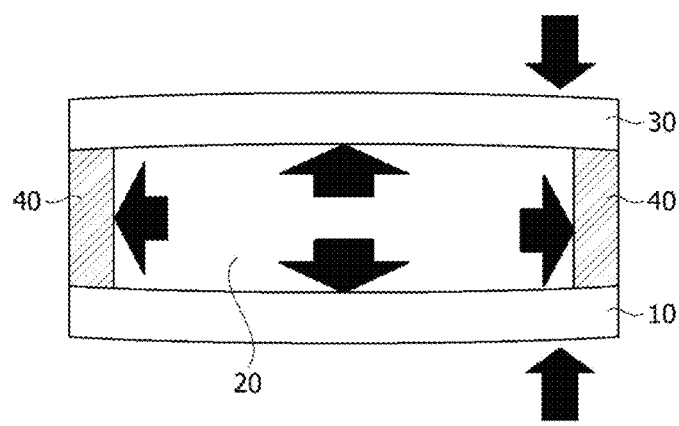
[Figure 4]

[Figure 5]
[Figure 6]
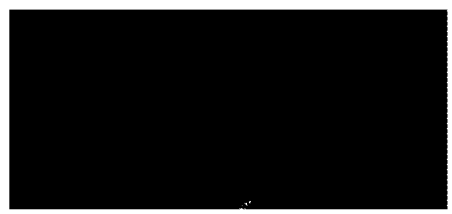
[Figure 7]
[Figure 8]
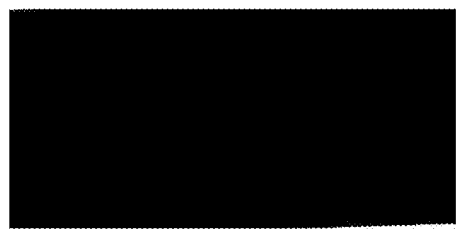
[Figure 9]
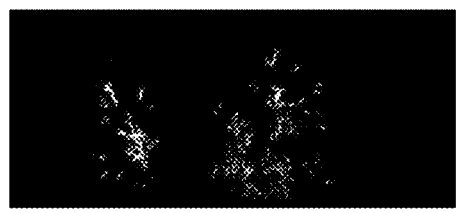

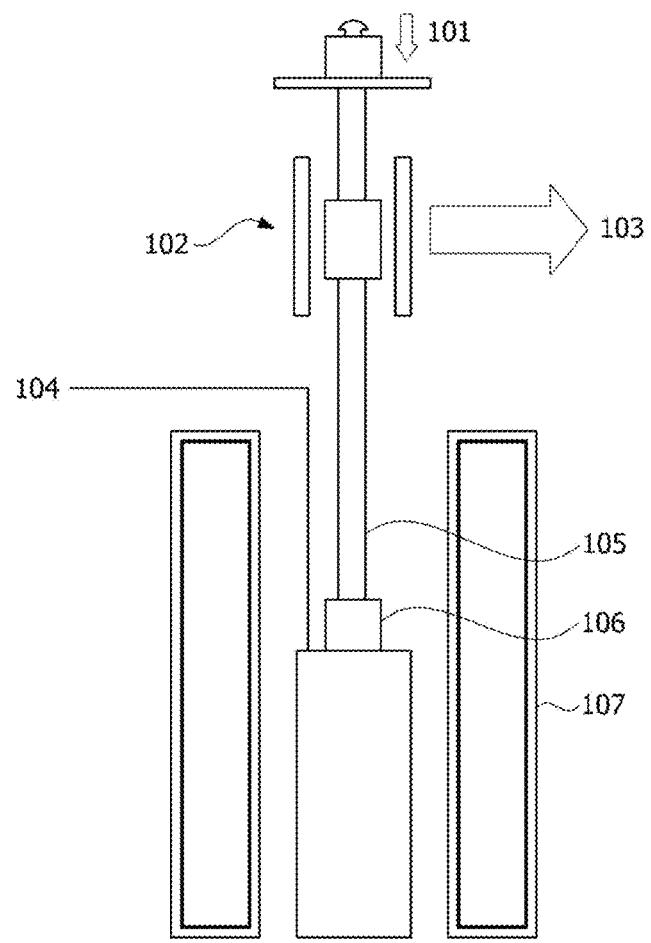
[Figure 10]

OPTICAL DEVICE AND USE THEREOF

CROSS-REFERENCE TO RELATED APPLICATION

The present application is a national phase entry under 35 U.S.C. § 371 of International Application No. PCT/KR2019/004967 filed Apr. 24, 2019, which claims the benefit of priority based on Korean Patent Application No. 10-2018-0048684 filed on Apr. 26, 2018, the disclosure of which are incorporated herein by reference in their entirety.

TECHNICAL FIELD

The present application relates to an optical device and a use thereof.

BACKGROUND ART

A base material used in an optical device that varies transmittance using liquid crystals determines transmittance, a phase difference or a glass transition temperature (Tg), and the like depending on the manufacturing process and use of the product.

In Patent Document 1 (Korean Laid-Open Patent Publication No. 10-2017-0064744), as the base material having high optical transmittance, a triacetyl cellulose (TAC) film, a polycarbonate (PC) film, a cycloolefin copolymer (COP) film, a polyethylene terephthalate (PET) film, and the like has been used.

When a flexible base material is used, the shape of the base material is deformed during a process of changing the temperature upon testing durability, so that negative pressures lower than the atmospheric pressure are formed inside the optical device, and thus there may be a problem that external air is introduced and bubbles are generated. Therefore, there is a need for an optical device capable of fundamentally blocking external bubble inflow by eliminating the negative pressure generated upon shape deformation of the base material and generating a positive pressure.

DISCLOSURE

Technical Problem

It is an object of the present application to provide an optical device capable of suppressing external bubble inflow by eliminating negative pressures that can occur due to shape deformation of a base material in an environment changing between a high temperature and a low temperature and generating a positive pressure.

Technical Solution

The present application relates to an optical device. Hereinafter, the optical device of the present application will be described with reference to the accompanying drawings, where the accompanying drawings are illustrative and the optical device of the present application is not limited by the accompanying drawings.

FIG. 1 illustratively shows an optical device according to one example of the present application. As shown in FIG. 1, the optical device may comprise a first base layer (10), a liquid crystal layer (20) and a second base layer (30) sequentially. At least one of the first base layer (10) and the second base layer (30) may be a heat shrinkable base layer.

In this specification, the heat shrinkable base layer may mean a base layer having shrinkage characteristics upon heat treatment. As the optical device of the present application uses the heat shrinkable base layer as the base layer, it can suppress external bubble inflow by contracting the base layer in an environment changing between a high temperature and a low temperature to generate a positive pressure inside the optical device.

In one example, the heat shrinkable base layer may have a length change rate ($\Delta L$) of a negative number in the following equation 1.

$$\Delta L = \frac{L - L_0}{L_0} \times 100 \qquad \text{[Equation 1]}$$

In Equation 1 above, $L_0$ is the length of the base layer in one direction at 25° C. and L is the length of the base layer in one direction after heat treatment at any one temperature of 80° C. to 150° C. for any one time of 1 minute to 180 minutes.

Specifically, L is the length of the base layer in one direction after heat treatment at any one temperature of 90° C. to 140° C., 100° C. to 130° C., 110° C. to 125° C., or 115° C. to 125° C. for any one time of 10 minutes to 150 minutes, 20 minutes to 120 minutes, 30 minutes to 90 minutes, 45 minutes to 75 minutes, or 50 minutes to 70 minutes.

In one example, the one direction may be an MD (machine direction) direction. In this specification, the MD direction may mean a length direction or a longitudinal direction of a base layer, and the TD (transverse direction) direction may mean a width direction or a transverse direction of a base layer. Furthermore, in this specification, the longitudinal direction may mean a traveling direction of a machine for forming a base layer, and the transverse direction may mean the direction perpendicular to the traveling direction of the base layer.

In addition, when the heat shrinkable base layer shrinks in the MD direction, it can expand in the TD direction. In one example, when the heat shrinkable base layer shrinks in the MD direction, it can expand in the TD direction at an expansion rate of about 0.01 times to 0.5 times or 0.05 times to 0.2 times, specifically, 0.1 times an MD direction shrinkage rate.

In this specification, when the term such as vertical, horizontal, orthogonal or parallel is used while defining an angle, it means substantially vertical, horizontal, orthogonal, or parallel to the extent that the desired effect is not impaired, which includes, for example, an error that takes a production error or a deviation (variation), and the like, into account. For example, each case of the foregoing may include an error within about ±15 degrees, an error within about ±10 degrees or an error within about ±5 degrees.

In this specification, when the length change rate value of the base layer is negative, it can be referred to as a heat shrinkable base layer, and when the length change rate value of the base layer length is positive, it can be referred to as a heat expandable base layer. In this specification, the size of the length change rate, that is, the absolute value of the length change rate, in the heat shrinkable base layer can be referred to as a shrinkage rate, and the absolute value of the length change rate, that is, the absolute value of the length change rate, in the heat expandable base layer can be referred to as an expansion rate.

In one example, the shrinkage rate of the heat shrinkable base layer may be 0.001% or more, 0.002% or more, 0.004% or more, 0.006% or more, 0.008% or more, or 0.01% or more. When the shrinkage rate of the heat shrinkable base layer is in the above range, it may be advantageous to suppress external bubble inflow in an environment changing between a high temperature and a low temperature.

When the shrinkage rate of the heat shrinkable base layer is excessively high, the volume space inside the liquid crystal cell becomes too smaller than the volume of the liquid crystal compound, whereby the shape of the liquid crystal cell may not be maintained due to the problem that the sealant is blown. In addition, when the shrinkage rate is excessively high in a state where a spacer for holding a cell gap is included in the liquid crystal layer, a defect may be caused in the form of a dark spot in a portion where the cell gap becomes larger than the size of the spacer. The upper limit of the shrinkage rate of the heat shrinkable base layer can be adjusted in consideration of the foregoing, which can be, for example, 5% or less, and can be, specifically, 3% or less, 1% or less, or 0.7% or less.

In one example, any one of the first base layer and the second base layer may be the heat shrinkable base layer. At this time, as the other base layer, a known base film used in an optical device can be used. Such a base film can be exemplified by a base film comprising TAC (triacetyl cellulose); a COP (cycloolefin copolymer) such as a norbornene derivative; PMMA (poly(methyl methacrylate)); PC (polycarbonate); PE (polyethylene); PP (polypropylene); PVA (polyvinyl alcohol); DAC (diacetyl cellulose); Pac (polyacrylate); PES (poly ether sulfone); PEEK (polyetheretherketon); PPS (polyphenylsulfone), PEI (polyetherimide); PEN (polyethylene naphthalate); PET (polyethylene terephtalate); PI (polyimide); PSF (polysulfone); PAR (polyarylate) or an amorphous fluororesin, but is not limited thereto.

In one example, both the first base layer and the second base layer may be the heat shrinkable base layer. At this time, the length change rates of the first base layer and the second base layer may be adjusted within a range that satisfies the above range. Through such a structure, it may be more advantageous to suppress external air bubble inflow which may occur upon temperature change or holding for a long time. In one example, the length change rates of the first base layer and the second base layer may be the same or different from each other.

The material, optical properties, and the like of the heat shrinkable base layer can be appropriately selected so as to satisfy the length change rate of Equation 1.

In one example, the heat shrinkable base layer may be a retardation film having an in-plane retardation value of 3000 nm or more for light having a wavelength of 550 nm. Such a retardation film can be referred to as a super retardation film. Specifically, the in-plane retardation value of the super retardation film for light having a wavelength of 550 nm may be 5000 nm or more, 7000 nm or more, 8000 nm or more, 10000 nm or more, or 12000 nm or more. In addition, the upper limit of the in-plane retardation value of the super retardation film for light having a wavelength of 550 nm may be 50000 nm or less, 40000 nm or less, 30000 nm or less, 20000 nm or less, 18000 nm or less, or 16000 nm or less. When the super retardation film satisfying the in-plane retardation within the above-mentioned range is used as the heat shrinkable base layer, it may be advantageous in terms of suppressing a rainbow phenomenon caused by the phase difference generated by using the optical device together with a polarizing film.

In one example, as the kind of the heat shrinkable base layer, a polyester-based film may be used, and preferably a polyethylene terephthalate (PET) film can be used. In this case, it may be appropriate to implement the super retardation film.

In another example, a cellulose-based film may be used as the heat shrinkable base layer, and preferably, a triacetyl cellulose (TAC) film may be used. When the TAC film is used as the heat shrinkable base layer, it may be advantageous in terms of suppressing a rainbow phenomenon caused by the phase difference generated by using the optical device together with a polarizing film.

The in-plane retardation value of the triacetyl cellulose (TAC) film for light having a wavelength of 550 nm may be appropriately selected in consideration of the object of the present application, which may be, for example, −10 nm to 10 nm. According to one example of the present application, a triacetyl cellulose (TAC) film having an in-plane retardation value of 0 nm may be used.

Such a heat shrinkable base layer may be prepared by a method known in the art. In one example, the heat shrinkable base layer may be a stretched polymer film. In one example, a commercially available product can be used as the heat shrinkable base layer, and specifically, a SRF (super retardation film) from Toyobo Co., or a none TAC film from FUJI Co., Ltd. can be used.

The optical device can suppress external bubble inflow as the base layer contracts in an environment changing between a high temperature and a low temperature to generate a positive pressure higher than the atmospheric pressure inside the optical device. The high temperature may mean, for example, a temperature in the range of 90° C. to 100° C., and the low temperature may mean a temperature range of, for example, −30° C. to −40° C. In this specification, the inside of the optical device may mean a space between the first base layer and the second base layer, for example, a space of the liquid crystal layer. In this specification, the term "positive pressure" means a pressure higher than the atmospheric pressure. As shown in FIG. 2, when the positive pressure is generated inside the optical device, the external bubble inflow can be suppressed. Furthermore, in this specification, the term "negative pressure" means a pressure lower than the atmospheric pressure. As shown in FIG. 3, when the negative pressure is generated inside the optical device, external bubbles can be introduced into the inside.

The thickness of the first base layer and/or the second base layer may be, for example, in a range of 10 μm to 500 μm, specifically, 30 μm to 400 μm, 50 μm to 300 μm, 70 μm to 200 μm or 80 μm to 100 μm. When the thickness range of the first base layer and/or the second base layer is in the above range, it may be more advantageous to suppress external bubble inflow in an environment changing between a high temperature and a low temperature.

The optical device may further comprise an electrode layer. In one example, the optical device may comprise a first electrode layer (not shown) formed on the first base layer and a second electrode layer (not shown) formed on the second base layer. The first electrode layer may be disposed between the first base layer and the liquid crystal layer, and the second electrode layer may be disposed between the second base layer and the liquid crystal layer.

As the first electrode layer and/or the second electrode layer, a transparent conductive layer may be used. For example, as the first electrode layer and/or the second electrode layer, a layer formed by depositing a conductive polymer, a conductive metal, a conductive nanowire, or a metal oxide such as ITO (indium tin oxide) may be used. As the first electrode layer and the second electrode layer according to one example, indium tin oxide (ITO) may be used.

The optical device may further comprise an alignment film. In one example, the optical device may comprise a first alignment film (not shown) formed on the first electrode layer and a second alignment film (not shown) formed on the second electrode layer. The first alignment film may be disposed between the first electrode layer and the liquid crystal layer, and the second alignment film may be disposed between the second electrode layer and the liquid crystal layer.

As the first and second alignment films, a horizontal alignment film or a vertical alignment film may be applied. In one example, both the first alignment film and the second alignment film may be horizontal alignment films. In another example, any one of the first alignment film and the second alignment film may be a horizontal alignment film, and the other may be a vertical alignment film. The first alignment film and the second alignment film may have orientation force capable of controlling the initial alignment state of the liquid crystal compound and the anisotropic dye present in the liquid crystal layer (20). For example, as the first alignment film and the second alignment film, a contact type alignment film such as a rubbing alignment film, or an alignment film comprising a photo-alignment compound, which is known to be capable of exhibiting orientation characteristics by a non-contact method such as irradiation of linearly polarized light, can be used.

The transmittance of the liquid crystal layer can be varied depending on whether or not a voltage is applied. The variable range of the transmittance in the liquid crystal layer can be appropriately selected depending on the use of the optical device to be described below.

In one example, when the initial alignment state of the liquid crystal compound and the anisotropic dye in the liquid crystal layer (20) is a vertically oriented state, a transparent mode can be implemented in a state where the initial voltage is not applied, and a black mode can be implemented after the voltage is applied. In another example, when the initial alignment state of the liquid crystal compound and the anisotropic dye in the liquid crystal layer (20) is a horizontally oriented state, a non-transparent mode can be implemented in a state where the initial voltage is not applied, and a transparent mode can be implemented after the voltage is applied.

In one example, the liquid crystal layer (20) can switch between a transparent mode having transmittance of 40% or more and a non-transparent mode having transmittance of less than 40% depending on voltage application. In one specific example, when the optical device is applied to a sunroof to be described below, the liquid crystal layer can switch between a transparent mode having transmittance of 15% or more and a non-transparent mode having transmittance of 1% or less depending on voltage application.

The liquid crystal layer (20) may comprise a liquid crystal compound. As the liquid crystal compound, a liquid crystal compound whose orientation direction can be changed by external voltage application can be used without any particular limitation. As the liquid crystal, for example, a smectic liquid crystal, a nematic liquid crystal or a cholesteric liquid crystal, and the like can be used. Furthermore, the liquid crystal may be, for example, a compound without any polymerizable group or crosslinkable group, so that the orientation direction can be changed by external voltage application.

In addition, the liquid crystal layer (20) may further comprise an anisotropic dye. The anisotropic dye may contribute to the transmittance variation by improving a light shielding ratio of the optical device. In this specification, the term "dye" may mean a substance that is capable of intensively absorbing and/or modifying light in at least a part or the entire range within a visible light region, for example, a wavelength range of 400 nm to 700 nm. Furthermore, in this specification, the term "anisotropic dye" may mean a substance capable of anisotropically absorbing light in at least a part or the entire range of the visible light region. As the anisotropic dye, for example, a known dye known to have a property capable of being aligned according to the alignment state of the liquid crystal can be selected and used, and for example, a black dye can be used. Such a black dye is known, for example, as an azo dye or an anthraquinone dye, but is not limited thereto.

The liquid crystal layer (20) may further comprise a sealant (40) on the sides thereof. The sealant (40) can play a role in preventing the liquid crystal from leaking from the liquid crystal layer (20), maintaining the cell gap at a constant interval, and firmly bonding it. The sealant (40) may be present to be adjacent to members in contact with both sides of the liquid crystal layer (20). The members in contact with both sides of the liquid crystal layer (20) may be the first base layer (10) and the second base layer (30), or may be the first alignment film and the second alignment film, or may be the first electrode layer and the second electrode layer. The sealant (40) may comprise a curable resin. As the curable resin, an ultraviolet curable resin or a thermosetting resin, and the like can be used.

The driving mode of the optical device using the liquid crystal is not particularly limited, which can be exemplified by, for example, a DS (dynamic scattering) mode, an ECB (electrically controllable birefringence) mode, an IPS (in-plane switching) mode, an FFS (fringe-field switching) mode, an OCB (optically compensated bend) mode, a VA (vertical alignment) mode, an MVA (multi-domain vertical alignment) mode, a PVA (patterned vertical alignment) mode, an HAN (hybrid aligned nematic) mode, a TN (twisted nematic) mode, an STN (super twisted nematic) mode, and the like.

The optical device may be driven by a single liquid crystal cell structure comprising one liquid crystal layer, or may be driven by a multi-layer liquid crystal cell structure comprising two or more liquid crystal layers. Furthermore, the optical device can be used together with a known functional layer such as an absorption type polarizing film, a reflection type polarizing film, a reflection layer with mirror reflection characteristics, a ¼ wave plate or a ½ wave plate to adjust transmittance-variable characteristics.

The present application also relates to a use of the optical device. An exemplary optical device can suppress external bubble inflow as the base layer contacts in an environment changing between a high temperature and a low temperature to generate a positive pressure inside the optical device.

Such an optical device can be used, for example, as a transmittance-variable device. The transmittance-variable device can be exemplified by, for example, eyewear such as sunglasses, an AR (argumented reality) or a VR (virtual reality); a smart window for building exterior walls; or a vehicle sunroof, a front door window, a rear door window, a backlite, a windshield, and the like, but is not limited thereto.

In one specific example, the optical device can be used as a vehicle sunroof. For example, an automobile may comprise a vehicle body, on which one or more openings are formed, and an optical device mounted to the opening. The manner of constructing such a sunroof is not particularly limited, where a conventional method can be applied as long as the optical device is used.

Advantageous Effects

The present application can provide an optical device capable of suppressing external bubble inflow by eliminating negative pressures that can occur due to shape deformation of a base material in an environment changing between a high temperature and a low temperature and generating a positive pressure. Such an optical device can be used as various transmittance-variable devices.

BRIEF DESCRIPTION OF DRAWINGS

FIG. 1 is a diagram illustratively showing an optical device according to one example of the present application.

FIG. 2 is an exemplary diagram for explaining a case where a positive pressure is generated inside an optical device in the present application.

FIG. 3 is an exemplary diagram for explaining a case where a negative pressure is generated inside an optical device in the present application.

FIG. 4 is an image photographing the initial state of the optical device in Example 1 before heat treatment using a digital camera.

FIG. 5 is an image photographing a state of the optical device in Example 1 after repeated heat treatment using a digital camera.

FIG. 6 is an image photographing the initial state of the optical device in Comparative Example 1 before heat treatment using a digital camera.

FIG. 7 is an image photographing a state of the optical device in Comparative Example 1 after repeated heat treatment using a digital camera.

FIG. 8 is an image photographing the initial state of the optical device in Comparative Example 2 before heat treatment using a digital camera.

FIG. 9 is an image photographing a state of the optical device in Comparative Example 2 after repeated heat treatment using a digital camera.

FIG. 10 is a detailed diagram of TMA equipment.

MODE FOR INVENTION

Hereinafter, the present application will be specifically described by way of examples, but the scope of the present application is not limited by the following examples.

Measurement Example 1. Shrinkage Rate Measurement of Base Layer after Heat Treatment For a base layer, a heat shrinkage rate was measured by a method of measuring length changes of a sample that appear while changing a temperature of 5° C. under the conditions of 25° C. to 120° C., using a TMA (thermomechanical analysis) apparatus under the trade name of Q400 manufactured by TA instruments. The heat shrinkage rate is based on length changes of the sample, where in Examples and Comparative Examples, the length change rate means a length change rate measured after being left at 120° C. for 1 hour. The sample of the base layer was prepared so as to have an area of 600 mm×300 mm and a thickness of 80 μm.

Specifically, the length change rate of the sample is measured by a thermal expansion coefficient meter (TMA). The TMA is a measurement method that measures deformation of a sample appearing under a given load as a function of temperature and time when the sample has been heated or cooled to a given temperature condition. As shown in FIG. 7, the force pressing the sample between the quartz stage and the probe, which have little thermal deformation depending on temperatures, is 0.05 N, which is adjustable. While controlling the temperature, the position change of the probe by the sample is measured by the electrical signal of the LVDT.

Force application range: 0.001 N to 2 N
Temperature range: −150 to 1000° C.
Resolution: 15 nm
Sensitivity: 20 nm or less According to the above method, the length change rates of the base layer after heat treatment were measured according to the following equation 1, and the results were shown in Table 1 below.

$$\Delta L = \frac{L - L_0}{L_0} \times 100 \qquad \text{[Equation 1]}$$

In Equation 1 above, $L_0$ is the length of the base layer in the MD direction at 25° C. and L is the length of the base layer in the MD direction after heat treatment at 120° C. for 1 hour.

Example 1

As each of a first base layer and a second base layer, a heat shrinkable base layer having a length change rate of −0.62% in Evaluation Example 1 was prepared. The heat shrinkable base layer is a PET (polyethylene terephthalate) film (SRF (super retardation film), manufactured by Toyobo) having an in-plane retardation value of 9000 nm for light having a wavelength of 550 nm and a thickness of 80 μm.

ITO (indium-tin-oxide) was deposited on the first base layer and the second base layer to a thickness of 200 nm, respectively, to form first and second electrode layers. A horizontal alignment film (SE-7492, manufactured by Nissan Chemical Co., Ltd.) was coated on the first electrode layer and the second electrode layer to a thickness of 300 μm, respectively, and cured to form first and second alignment films.

An optical device was produced by applying a sealant to the outer periphery of the first alignment film, applying liquid crystals (MDA 14-4145, manufactured by Merck) to the inner area of the sealant and laminating the second alignment film thereto. The produced device has an area of 600 mm×300 mm and a cell gap of 12 μm.

Example 2

An optical device was manufactured in the same manner as in Example 1, except that a TAC film (None, manufactured by FUJI) having a length change ratio of −0.01% in Evaluation Example 1 and a thickness of 80 μm was used as the first base layer and the second base layer, respectively.

Comparative Example 1

An optical device was manufactured in the same manner as in Example 1, except that a PC1 (polycarbonate) film (manufactured by Teigin) having a length change ratio of +0.15% in Evaluation Example 1 and a thickness of 100 μm was used as the first base layer and the second base layer, respectively.

Comparative Example 2

An optical device was manufactured in the same manner as in Example 1, except that a PC2 (polycarbonate) film (manufactured by Keiwa) having a length change ratio of +0.16% in Evaluation Example 1 and a thickness of 100 μm was used as the first base layer and the second base layer, respectively.

Comparative Example 3

An optical device was manufactured in the same manner as in Example 1, except that a COP (cycloolefin copolymer) film (ZF14, manufactured by Zeon) having a length change ratio of +0.11% in Evaluation Example 1 and a thickness of 100 μm was used as the first base layer and the second base layer, respectively.

Evaluation Example 1. Evaluation of High Temperature Durability

The optical devices of Examples and Comparative Examples were each subjected to a cycling test 10 times from a high temperature of 90° C. to a low temperature of −40° C. and then bubble occurrence was observed inside the optical device, and the results were shown in Table 1 below. The bubbles generated inside the optical device could also be observed with naked eyes, and the images photographing them with a digital camera were shown in FIGS. 4 to 9.

As shown in Table 1 below, in the case of Examples 1 and 2 using the heat shrinkable base layer, no bubbles were generated inside the optical device, but in the case of Comparative Examples 1 to 3 using the heat expandable base layer, bubbles were generated inside the optical device.

FIGS. 4 and 5 are images photographing the initial state of Example 1 before heat treatment and the state of Example 1 after 10 times of the cycling test, respectively, with a digital camera. FIGS. 6 and 7 are images photographing the initial state of Comparative Example 1 before heat treatment and the state of Comparative Example 1 after 10 times of the cycling test, respectively, with a digital camera. FIGS. 8 and 9 are images photographing the initial state of Comparative Example 2 before heat treatment and the state of Comparative Example 2 after 10 times of the cycling test, respectively, with a digital camera. As shown in FIGS. 4 and 5, in Example 1, no bubbles were observed with naked eyes even after the cycling test, but as shown in FIGS. 6 to 9, in Comparative Examples 1 and 2, bubbles observed with naked eyes after the cycling test were generated.

TABLE 1

|  | Example | | Comparative Example | | |
| --- | --- | --- | --- | --- | --- |
|  | 1 | 2 | 1 | 2 | 3 |
| Length change rate (%) | −0.62 | −0.01 | 0.15 | 0.16 | 0.11 |
| Bubble occurrence | X | X | ○ | ○ | ○ |

○: bubbles were observed with naked eyes;
X: bubbles were not observed with naked eyes <Explanation of Reference Numerals> 10: first base layer 20: liquid crystal layer 30: second base layer 40: sealant 101: load 102: LVDT (linear variable differential transformer) 103: signal related to position 104: thermocouple 105: probe 106: sample 107: furnace

The invention claimed is:

1. An optical device comprising a first base layer, a liquid crystal layer and a second base layer sequentially and a sealant disposed between the first and the second base layers and the sealant surrounds the liquid crystal layer between the first and the second base layers,
   wherein at least one of the first base layer or the second base layer is a heat shrinkable base layer, wherein the optical device has a positive pressure higher than an atmospheric pressure therein upon changing a temperature from a high temperature of 90° C. to 100° C. to a low temperature of −30° C. to −40° C., wherein the heat shrinkable base layer is shrinkable in a MD direction and is expandable in a TD direction, wherein a shrinkage rate in the MD direction is in a range of 0.01% or more and 5% or less and an expansion rate in the TD direction is of 0.01 times to 0.5 times, wherein the first and the second base layers are configured to block external bubble inflow.

2. The optical device according to claim 1, wherein each of the first base layer and the second base layer is the heat shrinkable base layer.

3. The optical device according to claim 1, wherein the heat shrinkable base layer has a length change rate (ΔL) of a negative number in the following equation 1:

$$\Delta L = \frac{L - L_0}{L_0} \times 100 \quad \text{[Equation 1]}$$

wherein, $L_0$ is a length of the base layer in one direction at 25° C. and L is a length of the base layer in the MD direction after heat treatment at a temperature range of 80° C. to 150° C. for a time period of 1 minute to 180 minutes.

4. The optical device according to claim 3, wherein the heat shrinkable base layer has an absolute value of a length change rate of 0.001% or more.

5. The optical device according to claim 3, wherein the heat shrinkable base layer has an absolute value of a length change rate of 5% or less.

6. The optical device according to claim 1, wherein the heat shrinkable base layer is a retardation film having an in-plane retardation value of 3000 nm or more for light having a wavelength of 550 nm.

7. The optical device according to claim 1, wherein the heat shrinkable base layer is a polyethylene terephthalate (PET) film or a triacetyl cellulose (TAC) film.

8. The optical device according to claim 1, further comprising a first electrode layer and a second electrode layer formed on the first base layer and the second base layer, respectively.

9. The optical device according to claim 8, further comprising a first alignment film and a second alignment film formed on the first electrode layer and the second electrode layer, respectively.

10. The optical device according to claim 1, wherein the liquid crystal layer switches between a transparent mode having transmittance of 40% or more and a non-transparent mode having transmittance of less than 40% depending on voltage application.

11. The optical device according to claim 1, wherein the liquid crystal layer comprises a smectic liquid crystal compound, a nematic liquid crystal compound or a cholesteric liquid crystal compound.

12. The optical device according to claim 1, wherein the liquid crystal layer further comprises an anisotropic dye.

13. The optical device according to claim 1, wherein the liquid crystal layer further comprises the sealant on sides thereof.

\* \* \* \* \*